US007454758B2

(12) United States Patent
Chickering

(10) Patent No.: US 7,454,758 B2
(45) Date of Patent: Nov. 18, 2008

(54) INTER-PROCESS COMMUNICATION ON A COMPUTER

(75) Inventor: Roger Allen Chickering, Granite Bay, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 782 days.

(21) Appl. No.: 10/774,356

(22) Filed: Feb. 5, 2004

(65) Prior Publication Data

US 2005/0177835 A1 Aug. 11, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/313; 328/330
(58) Field of Classification Search ......... 719/312–317, 719/328, 330
See application file for complete search history.

(56) References Cited

U.S. PATENT DOCUMENTS

| 4,692,861 | A | * | 9/1987 | May ........................... 718/106 |
| 5,513,328 | A | | 4/1996 | Christofferson ............. 395/280 |
| 5,544,316 | A | | 8/1996 | Carpenter et al. ...... 395/200.03 |
| 5,862,328 | A | * | 1/1999 | Colyer ....................... 709/203 |
| 5,862,388 | A | | 1/1999 | Danneels et al. ............ 395/733 |
| 5,884,035 | A | | 3/1999 | Butman et al. ......... 395/200.48 |
| 6,026,430 | A | | 2/2000 | Butman et al. .............. 709/203 |
| 6,167,430 | A | | 12/2000 | Lurndal ...................... 709/203 |
| 6,179,489 | B1 | | 1/2001 | So et al. ...................... 395/672 |
| 6,216,163 | B1 | | 4/2001 | Bharali et al. ................ 709/227 |
| 6,298,370 | B1 | | 10/2001 | Tang et al. ................... 709/102 |
| 6,298,474 | B1 | | 10/2001 | Blowers et al. ................ 717/1 |
| 6,308,178 | B1 | * | 10/2001 | Chang et al. ................. 707/100 |

(Continued)

FOREIGN PATENT DOCUMENTS

EP 592080 A2 4/1994

(Continued)

OTHER PUBLICATIONS

Stevens, Richard W., Unix Network Programming, 1990, Prentice Hall, p. 108-110.*

(Continued)

*Primary Examiner*—Meng-Ai An
*Assistant Examiner*—Qing-Yuan Wu
(74) *Attorney, Agent, or Firm*—Michael A. Glenn; Glenn Patent Group

(57) ABSTRACT

The invention provides a method of inter-process communication between at least two application processes on one computer. One embodiment of the invention includes a first process of a first application determining a name of a first file in a file system of the computer, the name of the first file being associated with a second application, the first file containing information for the first process to connect to a second process of the second application for inter-process communication; and the first process initiating a first connection to the second process using the information contained in the first file; the first process communicating with the second process using the first connection if the first connection is successfully established; and the first process starting a third process of the second application if the first process fails to establish a connection with the second process.

46 Claims, 5 Drawing Sheets

U.S. PATENT DOCUMENTS

| | | | |
|---|---|---|---|
| 6,341,316 B1 | 1/2002 | Kloba et al. | 709/248 |
| 6,393,459 B1 | 5/2002 | Lurndal | 709/203 |
| 6,430,164 B1 | 8/2002 | Jones et al. | 370/313 |
| 6,470,398 B1 | 10/2002 | Zargham et al. | 709/318 |
| 6,539,435 B2* | 3/2003 | Bolmarcich et al. | 719/310 |
| 6,553,412 B1 | 4/2003 | Kloba et al. | 709/219 |
| 6,901,594 B1* | 5/2005 | Cain et al. | 719/310 |
| 6,938,085 B1* | 8/2005 | Belkin et al. | 709/227 |
| 7,010,796 B1* | 3/2006 | Strom et al. | 719/328 |

FOREIGN PATENT DOCUMENTS

| | | |
|---|---|---|
| EP | 286239 A2 | 3/2003 |
| EP | 296238 A2 | 3/2003 |

OTHER PUBLICATIONS

Campbell, D.L.; *Examining The Smartsockets Toolkit*; Dr. Dobb's Journal, vol. 21, No. 7, p. 74, 76-7, 84; Miller Freeman; USA; Jul. 1996.

Demaine, E.; *A Threads-Only MPI Implementation for the Development of Parallel Programs*; Dept. of Computer Science, University of Waterloo, Waterloo, Ontario, Canada.

*Overview of Corba*; http://www.cs.wustl.edu/~schmidt/corba-overview.html.

Montresor, A.; *The Jgroup Reliable Distributed Object Model*; Technical Report UBLCS-98-12; Department of Computer Science, University of Bologna, Italy; Dec. 1998.

Schmidt, D.C.; *An Architectural Overview of the ACE Framework; A Case-study of Successful Cross-platform Systems Software Reuse*; Department of Computer Science, Washington University, St. Louis, MO; USENIX Login, 1998.

*PowerQuest DeployCenter*; http://www.powerquest.com.

Rybaltchenko, K. et al.; *Installation and Using of ACE under SRT/CVS for the ATLAS DAQ Project*; http://atddoc.cern.ch/Atlas/Notes/087/Note087-1.html; Apr. 20, 1998.

Maybee, M.J.; *Component-Object Interoperability in a Heterogenous Distributed Environment*; Department of Computer Science, University of Colorado; 1995.

Gibbs, A.; *Platform-Independent Access to a Remote Spatial Database Management System*; Department of Computer Science, University of Adelaide; Nov. 7, 1997.

Pyarali, I. et al.; *Design and Performance of an Object-Oriented Framework for High-Speed Electronic Medical Imaging*; USENIX COOTS Conference, Toronto, Canada; Jun. 1996; Eastman Kodak Company; Department of Computer Science, Washington University.

Srinivasan, R.; *RPC: Remote Procedure Call Protocol Specification Version 2*, Network Working Group, Sun Microsystems; August 1995.

Sametinger, J.; *On a Taxonomy for Software Components*; Department of Computer Science, Brown University, Providence, RI, USA.

Schmidt, D.C.; *The Adaptive Communication Environment an Object-Oriented Network Programming Toolkit for Developing Communication Software*; Department of Computer Science, Washington University, St. Louis, MO; 11th and 12th Sun User Group Conferences in San Jose, California, Dec. 7-9, 1993 and San Francisco, California, Jun. 14-17, 1993.

Schmidt, D.C.; *Applying Design Patterns and Frameworks to Develop Object-Oriented Communication Software*; Department of Computer Science, Washington University, St. Louis, Mo; Handbook of Programming Languages, vol. I, MacMillan Computer Publishing, 1997.

Schmidt, D.C. et al.; *An OO Encapsulation of Lightweight OS Concurrency Mechanisms in the ACE Toolkit*; Department of Computer Science, Washington University, St. Louis, MO; Technical Report No. WUCS-95-31, techrep@cs.wustl.edu, Washington University; Feb. 11, 1999.

Coulouris, G. et al.; *Archive Material from Edition 2 of Distributed Systems: Concepts and Design*; Coulouris, Dolllimore and Kindberg, Distributed Systems, Edition 2, 1994, pp. 138-144.

Templeman, J. et al.; *COM Programming with Microsoft®.NET*; ISBN 0-7356-1875-5; Feb. 26, 2003.

Cappello, P. et al.; *CX: A Scalable, Robust Network for Parallel Computing*; Scientific Programming vol. 10, No. 2, p. 159-71; IOS Press, Netherlands; 2002.

Ma, R.K.K. et al.; *M-JavaMPI: A Java-MPI Binding with Process Migration Support*, Proceedings CCGRID 2002. 2nd IEEE/ACM International Symposium on Cluster Computing and the Grid, p. 255-62; IEEE Comput. Soc., Piscataway, NJ, USA; 2002.

Van Beneden, B.; *Examining QNX RTOS 6.1*; Dr. Dobb's Journal, vol. 27, No. 6 p. 54, 56-8, 60; CMP Media LLC; Jun. 2002.

Gaspar, C. et al.; *DIM, A Portable, Light Weight Package for Information Publishing, Data Transfer and Inter-Process Communication*; Computer Physics Communications Conference Title: Comput. Phys. Commun. (Netherlands), vol. 140, No. 1-2, p. 102-9; Elsevier; Netherlands; Oct. 15, 2001.

Du, W.; *Toward an Intensional Model for Programming Large Scale Distributed Systems*; Intensional Programming II. Based on the Papers at ISLIP'99, p. 244-58; World Scientific, Singapore; 2000.

Goldman, N.M.; Smiley—*An Interactive Tool for Monitoring Inter-Module Function Calls*; Proceedings IWPC 2000. 8th International Workshop on Program Comprehension, p. 109-18; IEEE Comput. Soc, Los Alamitos, CA, USA; 2000.

Deel, E.; *Interprocess Communication Using Anonymous Pipes*; Circuit Cellar Ink, No. 97, p. 36-40; Circuit Cellar Inc.; Aug. 1998.

Stamatakis, W.; *Using MAPI for Interapplication Communication*; Dr. Dobb's Journal, vol. 20, No. 11 p. 80, 82, 84, 86; Nov. 1995.

\* cited by examiner

INTER-PROCESS COMMUNICATION ON A COMPUTER

BACKGROUND OF THE INVENTION

1. Technical Field

This invention relates to inter-process communication in a computer environment. One embodiment of the invention relates to the inter-process communication on a single computer environment.

2. Description of Prior Art

Inter-process communications (IPC) use various communication methods, for example, shared memory, pipe, message queue or semaphore, to enable interactions between different application processes within the same computer or among different computers in a computer network system. The inter-process communications among multiple applications on a single computer allows individual application processes running on the computer to work together cooperatively.

The existing cross-platform inter-process communication methods, such as those based on the Common Object Request Broker Architecture (CORBA), can be used for the inter-process communication between application processes running on different computers with different operating systems. For example, CORBA provides a set of common interfaces through which object-oriented software can communicate, regardless of the computer platform on which the object-oriented software is running. However, such cross-platform inter-process communication methods are too heavy-weight to be a good solution for application processes running on a single computer. Existing inter-process communication methods for application processes running on a single computer, such as Component Object Model (COM) from Microsoft, Inc., are operating system-dependent and are not compatible with other platforms. For example, it would be difficult to port a set of software programs based on Component Object Model (COM) running on operating systems provided by Microsoft, Inc. to other operating systems, such as UNIX or Mac OS, etc.

Therefore, it would be advantageous to provide a method of inter-process communication for processes running on a single computer so that software applications based on such a method can be easily implemented and ported to different computer platforms running different operating systems.

SUMMARY OF INVENTION

The invention provides a method of inter-process communication between at least two application processes on one computer. One embodiment of the invention includes a first process of a first application for determining a name of a first file in a file system of the computer. The name of the first file is associated with a second application. The first file contains information for the first process to connect to a second process of the second application for inter-process communication. The first process initiates a first connection to the second process using the information contained in the first file. The first process communicates with the second process using the first connection if the first connection is successfully established; and the first process starts a third process of the second application if the first process fails to establish a connection with the second process.

The invention further allows the first process to initiate a second connection to the third process using the information in the first file, in response to the third process. This informs the first process that the third process is ready for a connection. The third process is started in a server mode without a user interface. Further, the first process fails to establish a connection with the second process because the second process is not running. The first file being missing from the file system indicates that the second process is not running.

In one embodiment, when the first process is started, the first process determines if a fourth process of the first application is running. The first process requests the fourth process to perform a task for the first process if the fourth process is running; and the first process exits after requesting the fourth process to perform the task for the first process.

Furthermore, the first process determines if the fourth process of the first application is running. This includes the first process of the first application determining a name of a second file in the file system of the computer, the name of the second file being associated with the first application. The second file being missing from the file system indicates that the fourth process of the first application is not running.

The second file contains information for the first process to connect to a fourth process for inter-process communication. Failure in connecting to the fourth process using the information contained in the second file indicates that the fourth process of the first application is not running; and success in connecting to the fourth process using the information contained in the second file indicates that the fourth process of the first application is running.

The first process communicates with the second process using the first connection through an Application Program Interface (API), which is platform independent. When the second process is started, the second process determines if a fourth process of the second application is running.

In one embodiment, the second process requests the fourth process to perform a task for the second process if the fourth process is running; and the second process exits after requesting the fourth process to perform the task for the second process.

DETAILED DESCRIPTION OF THE INVENTION

The IPC process according to the one embodiment of the invention provides a lightweight, cross-platform mechanism for applications to communicate with one another. For example, the IPC mechanism according to one embodiment of the invention is purposefully restricted to communication between applications running on a single computer under the control of a single instance of an operating system.

In addition, a mechanism is used to ensure that only one instance of each application runs at a time to provide the service. For example, when a second instance of an application is started while a first instance of the application is still running, the second instance of the application communicates the task to be performed to the first instance of the application. After the second instance of the application communicates the task to the first instance, the second instance automatically exits. The task is then performed by the first instance of the application. More details are described below.

Figure 1:
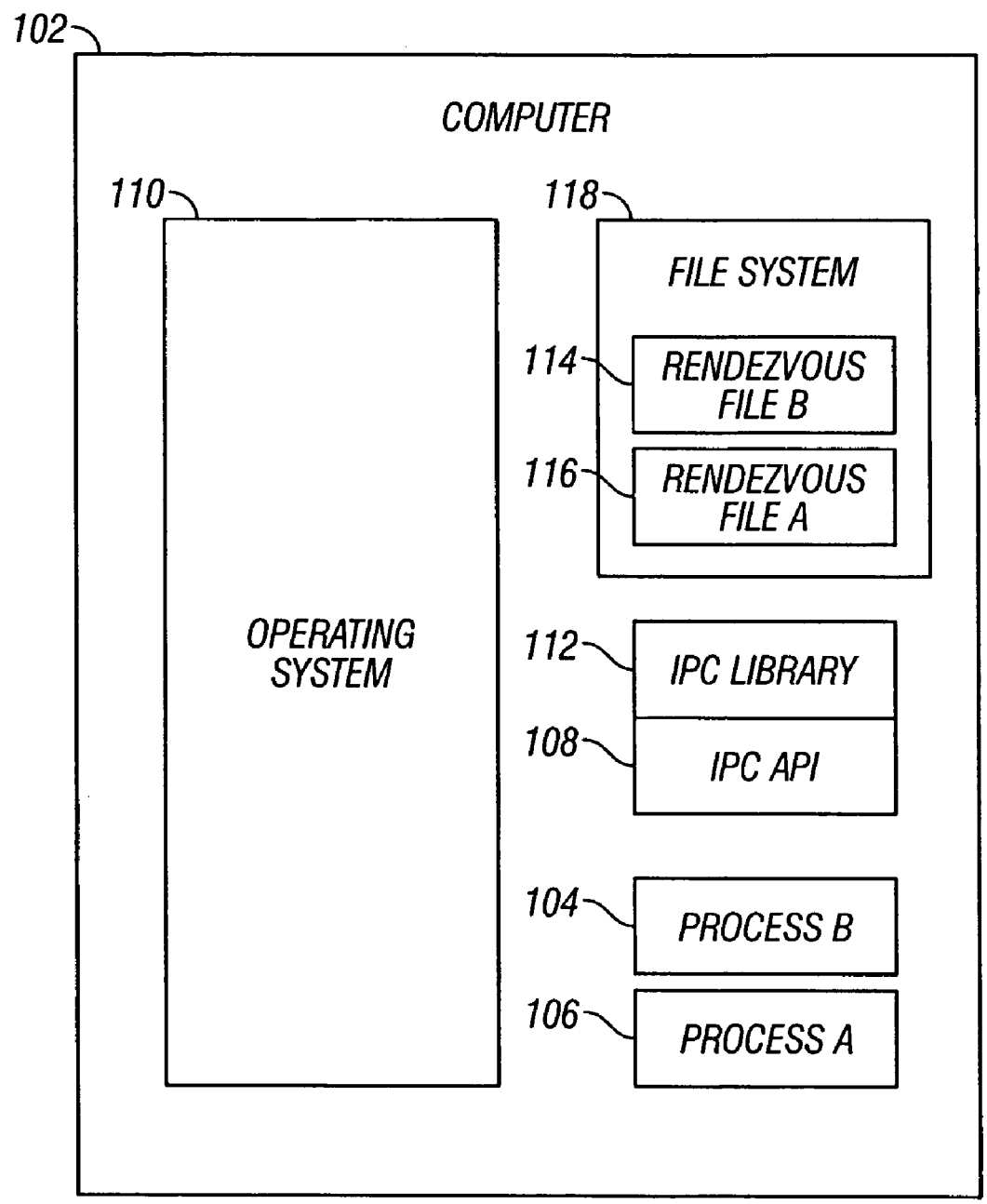
FIG. 1 is a block schematic diagram showing two application processes in inter-process communication on a single computer according to one embodiment of the invention.

FIG. 1 is a block schematic diagram showing two application processes in inter-process communication on a single computer according to one embodiment of the invention. Referring now to FIG. 1, a computer 102 includes an operating system 110. The operating system provides basic communication facilities for the application processes running under its control. These communication facilities are typically platform-dependent. The facilities available in one type of operating system may not be available or suitable for use in another type of operating system.

However, various different types of operating systems all provide access to files. In one embodiment of the invention, an inter-process communication mechanism is based on the access to rendezvous files, which contain platform-dependent information for establishing inter-process communication. Those skilled in the art will appreciate that a product other than rendezvous may be used to implement the discussed invention. The IPC library 112 makes use of the available communication facilities provided by the operating system 110 to provide an inter-process communication mechanism through a cross-platform Application Programming Interface (API) for different application processes, such as a process A 106 and a process B 104. Because the application programs for the process A 106 and the process B 104 are written using the cross-platform API for inter-process communication, the application programs can be easily ported to an operating system that is different from the operating system 110.

In one embodiment of the invention, each application program has an associated rendezvous file. The rendezvous file contains the information about a running instance of the application program so that other running process can use the information to establish inter-process communication with this running instance of the application program. For example, a client application process, e.g. the process A 106, can find a server application process, e.g. the process B 104, by mapping the server's name to a file, e.g. the rendezvous file A 116, in the file system 118.

In one example, the rendezvous file of an application program is named after the application program and placed in a predetermined location in the file system so that other application processes can locate the rendezvous file without prior knowledge of the running instance of the application program. The file contains rendezvous information, including parameters necessary for the client to connect to the server. For example, the file system 118 can have a rendezvous file A 114 for process A of an application program, e.g. Application A, and a rendezvous file 116 for process B of another application program, e.g. Application B. The file 114 contains rendezvous information for the application process 104 and the file 116 contains the rendezvous information for the application process 108.

When the application process 104 needs to establish an inter-process communication channel to communicate with the application process A 106, the application process 104 computes the file name of rendezvous file A 116 from the name of the application program of process 106, opens the rendezvous file A 116, connects to the application process 106 using the information in the rendezvous file A 116, and communicates with process 106, using IPC library 112 through platform-independent API 108.

If a server application, e.g. process 106, is not running, the rendezvous file 116 will be missing or contain stale information that causes the connection to fail. In that case, a client application process 104 can start the server process 106, with a command line argument of "-server," which tells the server application to initialize itself and to get ready to serve the IPC requests, but not to display a user interface (UI). The client application process can start the server process in a server mode without a user interface so that the user is not bothered with a user interface of the server application program while the client application process obtains service from the server application. After the server process, e.g. 106, has initialized itself, the server process informs the client process, e.g. 104, that the server 106 is ready for IPC traffic and the client 104 makes a second attempt to connect, which normally succeeds.

In one embodiment of the invention, application processes can use the rendezvous files to combine multiple instances of an application program into one running instance. For example, when the application process B 104 of an application program is started to perform a task, the application process B 104 uses the IPC mechanism to look for a prior instance of the same application program. For example, before the application process B 104 initializes its rendezvous file, the application process 104 can try to locate the rendezvous file of the same application program and to communicate with a prior instance of the application program if the rendezvous file exists. If a prior instance 106 exists, the application process B 104 can establish an inter-process communication channel with the prior instance 106 and communicates the task of the application process B 104, such as the command line arguments for the application process, to the prior instance 106. After instructing the prior instance 106 to perform the task of the application process B 104, the application process B 104 exits. In this way, the action requested by the user of the second instance of an application program is actually performed by the first instance of the application program. Thus, multiple instances of a same application program can consolidate the tasks to be performed in one instance of the application program.

In one embodiment of the invention, all instances of one application program use the same rendezvous file. The rendezvous file contains valid information for only one instance of the application program at a time. When tasks for multiple instances of an application program are consolidated for process in only one instance of the application program, the computational resources of the computer can be used more efficiently. Further, inter-process communication between different instances of a same application or different applications can be simplified.

The client and the server status of application processes 104 and 106 can be interchangeable. For example, the process 104 can be an instance of a first application program, e.g. an email program, which has rendezvous information stored in file 116; and, the process 106 can be an instance of a second application program, e.g. an address book program, which has rendezvous information stored in file 116. The process 106 of the address book program can initiate an IPC channel using the rendezvous file 114 and request the process 116 of the email program to send an email message. In this scenario, the process 106 of the address book program is a client process and the process 104 of the email program is a server process.

In another scenario, the process 104 of the email program can initiate an IPC channel using the rendezvous file 116 and request the process 106 of the address book program to look up an email address of a person, in which the process 106 of the address book program is a server process and the process 104 of the email program is a client process. In general, a set of application programs may each provide services to others and obtain services from others. The set of application program can use the method of IPC according to embodiments of the invention to communicate with each other.

One embodiment of the invention provides a cross-platform API 108 for exchanging messages between applications. Each message has one or more key and value pairs. The applications specify the meanings of the keys and values so that applications can exchange meaningful information. There are two basic forms of messages: 1) commands from one application to tell another application to do something; and 2) events sent from a source application to a target application to inform the target application that something of interest has occurred in the source application.

In one embodiment of the invention, the cross-platform API 108 provides a simple mechanism for transmitting sets of keys and values between two processes running on the same computer. In one implementation, the keys and values are transmitted as strings; and, the unit of the transmission of the keys and values is an IPCMessage, which includes a set of keys and values.

For example, the following code creates an IPCMessage and associates some keys and values with it. In the following code example, the message "item" has keys "cn," "mail," "locality," and "st," hich may represent a name, an email address, locality, and a state. Key "cn" has a value of "Roger" in the message; key "mail" has a value of "rogc@netscape.com;" key locality" has a value of "Granite Bay"; and key "st" has a value of "CA."

```
IPCMessage* item = IPC_NewMessage( );
IPC_MessageSetValue(item,"cn","Roger");
IPC_MessageSetValue(item,"mail","rogc@example.com");
IPC_MessageSetValue(item,"locality","Granite Bay");
IPC_MessageSetValue(item,"st","CA");
```

More complex data structures can be stored in an IPCMessage by using the function "IPC_Serialize." In the following code example, the item that has key "cn" with value "Roger" and key "mail" with value "rogc@example.com" is serialized as the value of key "item1;" and, the item that has key "cn" with value "Bob" and key "mail" with value "bob@example.com" is serialized as the value of key "item2." The message includes keys "item1" and "item2" with the corresponding serialized values.

```
IPCMessage* message = IPC_NewMessage( );
IPCMessage* item = IPC_NewMessage( );
IPC_MessageSetValue(item,"cn","Roger");
IPC_MessageSetValue(item,"mail","rogc@example.com");
IPC_MessageSetValue(message,"item1",IPC_Serialize(item));
IPC_DestroyMessage(item);
item = IPC_NewMessage( );
IPC_MessageSetValue(item,"cn","Bob");
IPC_MessageSetValue(item,"mail","bob@example.com");
IPC_MessageSetValue(message,"item2",IPC_Serialize(item));
IPC_DestroyMessage(item);
```

The preceding example creates a message having two keys: "item1" and "item2." To extract the nested keys and values that are serialized as the values of the two keys, the receiving code can use IPC_Deserialize, as illustrated in the following code example. In the following code example, the received message is deserialized as item1 and item2, respectively. The values for keys "cn" and "mail" for item1 is retrieved and stored in variables name1 and mail1, respectively; and the values for keys "cn" and "mail" for item2 is retrieved and stored in variables name2 and mail2, respectively:

```
IPCMessage* item1 = IPC_NewMessage( );
IPC_Deserialize(item1,IPC_MessageGetValue(message,"item1"));
const char* name1 = IPC_MessageGetValue(item1,"cn");
const char* mail1 = IPC_MessageGetValue(item1,"mail");
IPCMessage* item2 = IPC_NewMessage( );
IPC_Deserialize(item2,IPC_MessageGetValue(message,"item2"));
const char* name2 = IPC_MessageGetValue(item2,"cn");
const char* mail2 = IPC_MessageGetValue(item2,"mail");
```

Figure 2:
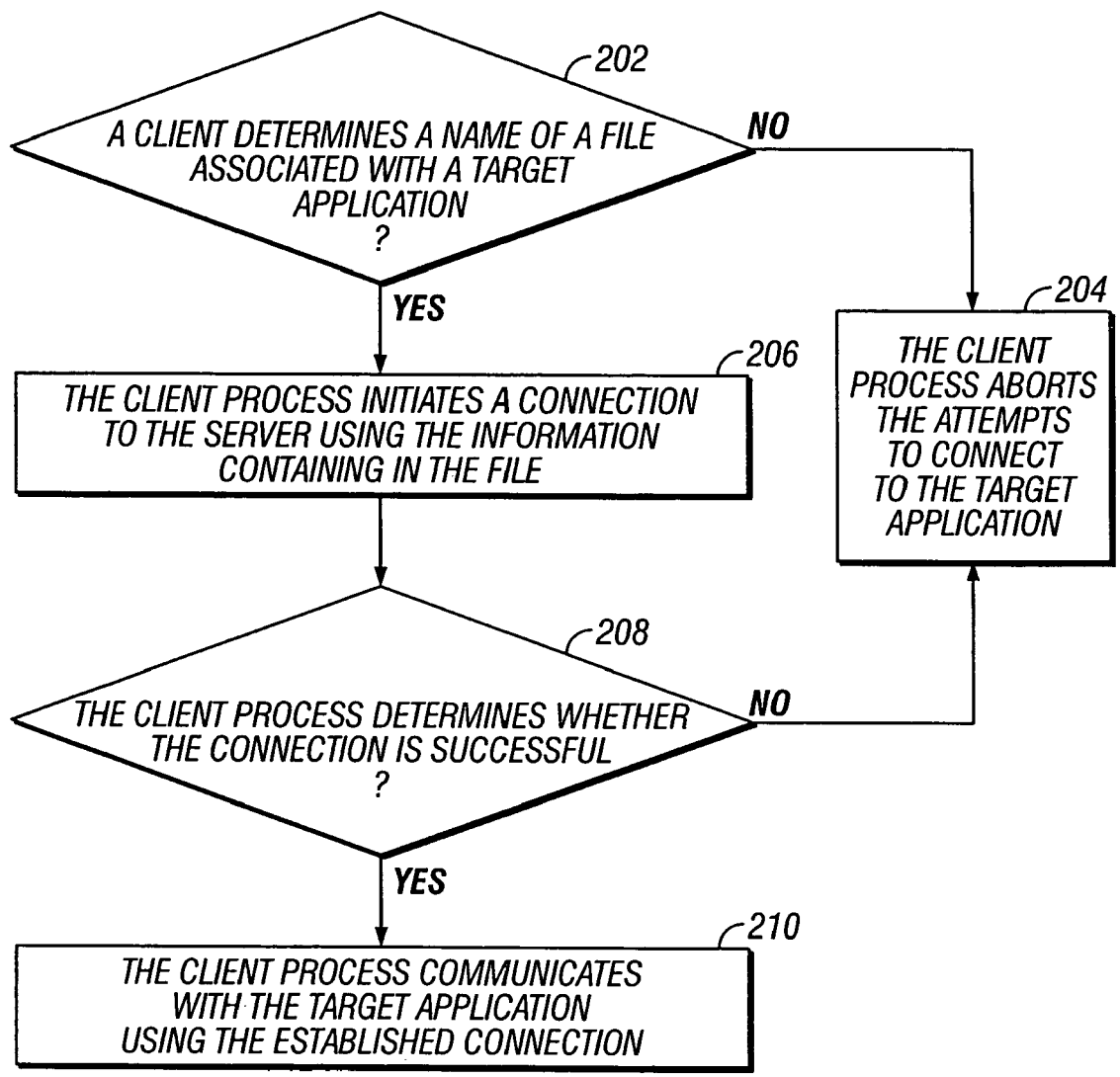
FIG. 2 is a figure diagram showing a method of inter-process communication between two applications on a single computer according to the invention.

FIG. 2 is a flow diagram showing a method of inter-process communication between two applications on a single computer according to the invention.

Referring now to FIG. 2, a client process determines a name of a file associated with a target application 202. If the file associated with the target application does not exist, the client process may abort the attempt to connect to the target application 204. If the file associated with the target application exists, the client process initiates a connection to the target application using the information containing in the file 206.

It is then determined whether the connection is successful or not 208. If it is determined that the connection is not successful 208, the information in the rendezvous file may be invalid, stale, and the client process aborts the attempts to connect to the target application 204. If it is determined that the connection is successful 208, the client process communicates with the target application using the established connection 210.

The client process may start one instance of the target application, which may display with or without a user interface. Typically, however, the client process starts the target application in the server mode without displaying a user interface.

Once an instance of the target application is started, the target application creates its associated rendezvous file. The client process may wait for the target process to create the rendezvous file. Alternatively, the client process may wait for the target process to open a channel using the rendezvous file of the client process and to inform the client process that the target process is ready for IPC traffic.

Once the client process locates the rendezvous file of the target application, the client process starts connecting to the target application process by opening an IPC communication channel using the information in the rendezvous file.

In one embodiment of the invention, each member of a group of IPC applications according to the invention provides services to the others. For example, the address book provides a service for resolving addresses and the mailer provides a service for creating new compose windows.

In one implementation, the IPC process according to the invention is provided by a cross-platform C API, a programming language which includes codes in a directory, e.g. the lib/ipc directory of the source tree. Each application using the IPC process subclasses a base class, e.g. PhotonApp from lib/wxutil. PhotonApp uses lib/ipc to establish itself as a server to other applications by creating the rendezvous file, and also enforces the invariant that only one instance of each application runs to perform tasks at a time. Other started instances transfer their tasks to the running instance for which the information in the rendezvous files is valid. The details are described below.

Figure 3:
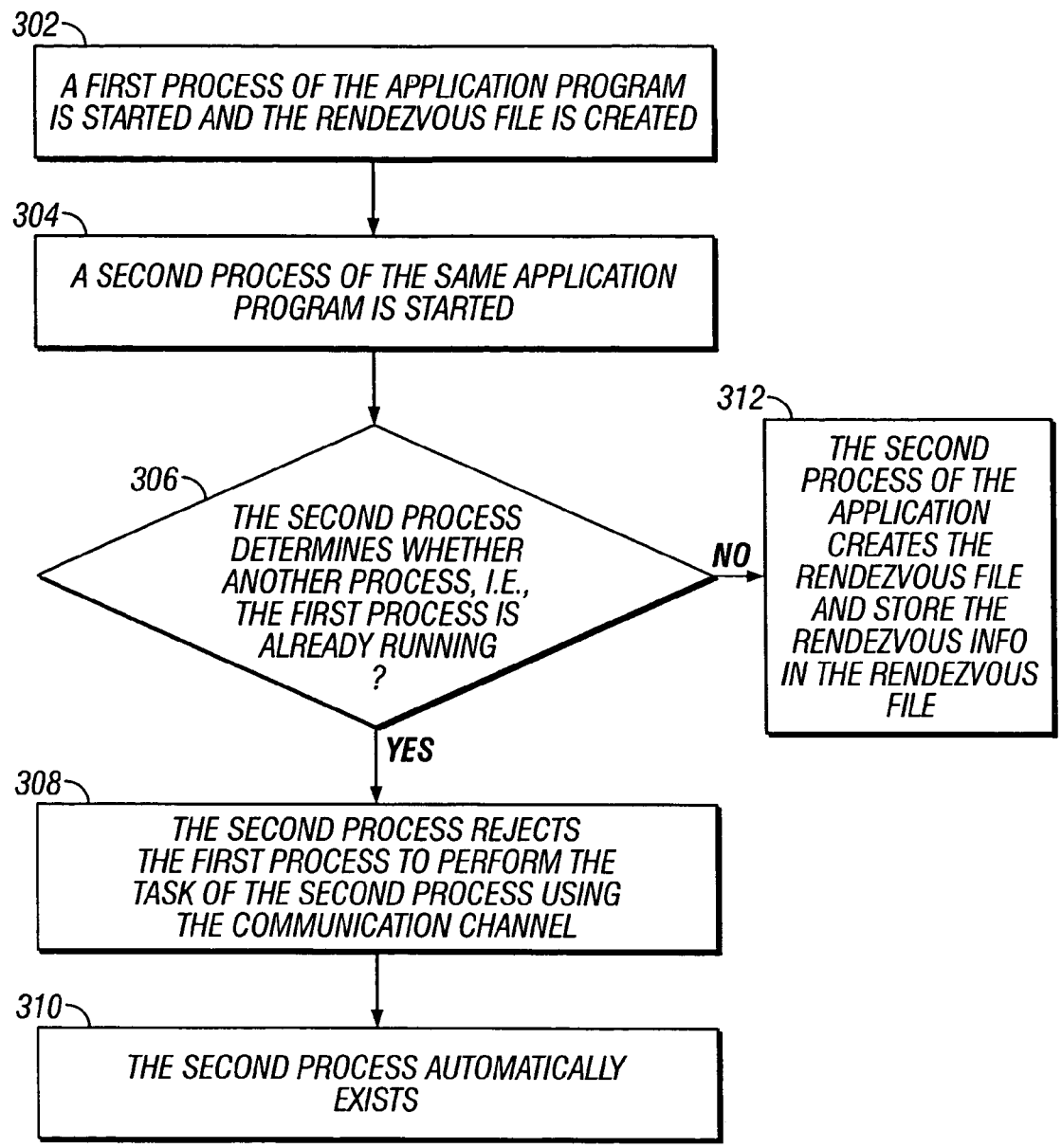
FIG. 3 is a figure diagram showing a method of inter-process communication between two processes of an application program on a single computer according to one embodiment of the invention.

FIG. 3 is a flow diagram showing a method of inter-process communication between two processes of an application program on a single computer according to one embodiment of the invention.

Referring now to FIG. 3, a first process in the application program is started and its associated rendezvous file is created subsequently 302. The rendezvous file describes a communication channel that allows a later started processes to connect to the first process. Then, a second process of the same application program is started 304.

The second process of the application program determines whether a prior instance of the application program exists or not, e.g. another process of the application program is already running or not 306. If the rendezvous file of the application program already exists, the second process thus determines that another process, i.e. the first process, is already running. The second process of the same application program can use the information in the rendezvous file to connect to the first process.

If it is determined that a prior instance of the application program, e.g. the first process is already running 306, the second process then requests the first process to perform the task of the second process using the communication channel 306. Then, the second process automatically exits 310. Thus, the task of the second process is actually performed by the first process.

However, if the rendezvous file of the application program does not exist or the connection using the rendezvous file of the application program fails, no prior instance of the application program is running. Thus, the second process of the application creates the rendezvous file and/or stores the rendezvous information in the rendezvous file of the application program 312.

In this way, the invention provides a method of IPC where only one copy of an application runs to perform tasks at a given moment. It is understood that an instance of an application program is a copy of running process of the application program.

Figure 4:
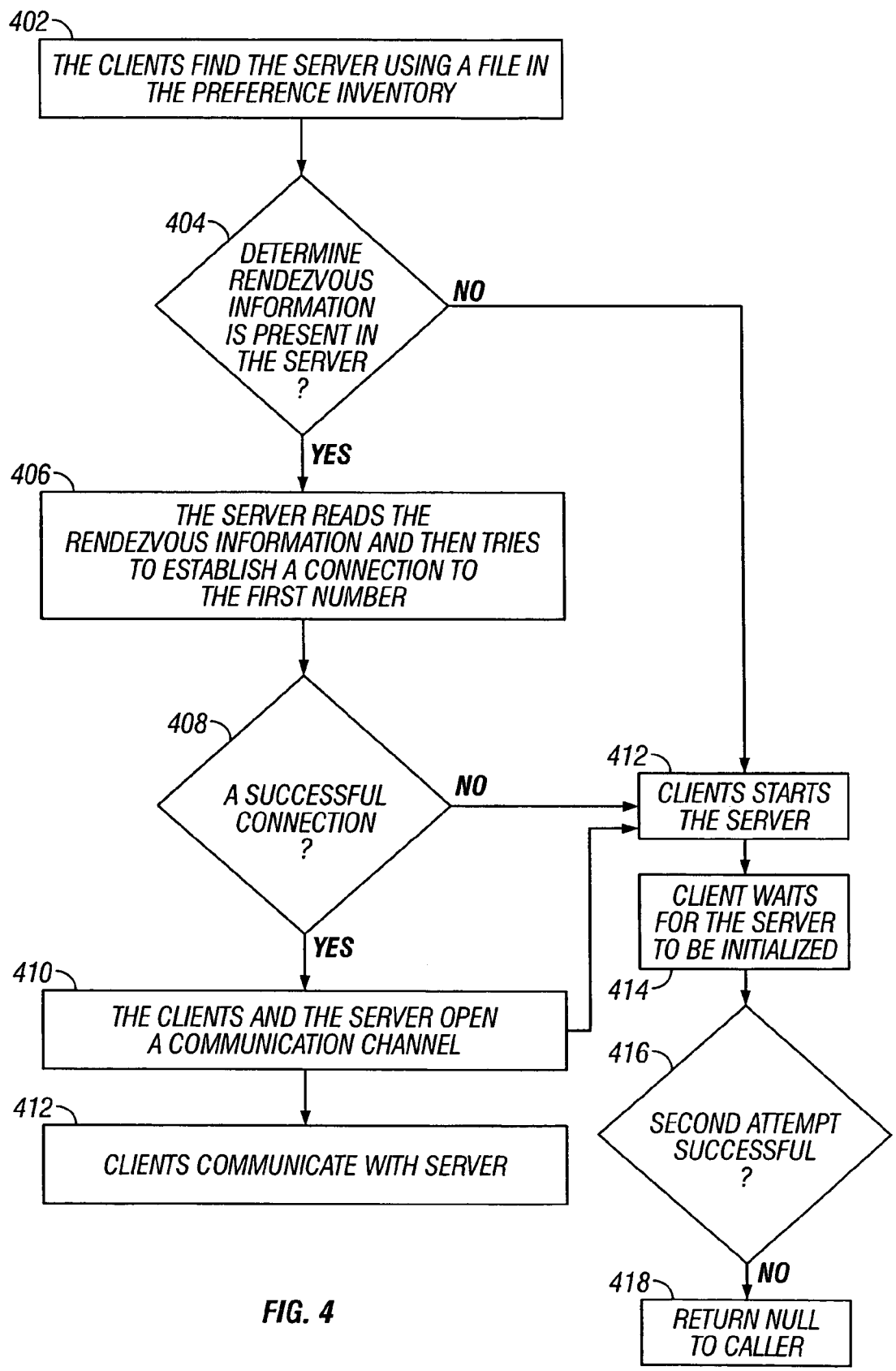
FIG. 4 is a figure diagram showing a method of inter-process communication between two applications on a single computer according to the invention.

FIG. 4 is a flow diagram showing a method of inter-process communication between two applications on a single computer according to the invention.

Referring now to FIG. 4, the invention provides a method of IPC between two applications on a single computer using a channel. To transmit an IPCMessage from one process to another an IPCChannel is used. One process is the server and the other process is the client. For example, the client creates an IPCChannel using

```
IPC_ReadMessage to receive a response:
IPCChannel*chan = IPC_OpenChannel("nsmail");
if (chan) {
IPCMessage* message = IPC_NewMessage( );
IPC_MessageSetValue(message,"ph_command","compose");
IPC_MessageSetValue(message,"to","roger@example.com");
if(IPC_WriteMessage(chan,message)==PR_SUCCESS) {IPCMessge*
reply=IPC_NewMessage( );
if (IPC_ReadMessage(chan,reply,
PR_INTERVAL_NOTIMEOUT)==PR_SUCCESS) {/*
* mailer launched a compose window with
* "roger@example.com in the "To:" field.
*/}
IPC_DestroyMessage(reply);
IPC_DestroyMessage(message);
IPC_CloseChannel(chan);
```

IPC_OpenChannel takes the name of an application and returns an IPCChannel that can be used to communicate with the one and only instance of that application.

The client finds the server using a file in the preference directory 402. The file is associated with the server. The client determines whether the rendezvous information is present in the server 404. If it is determined that the rendezvous information is present in the server 404, the client reads the rendezvous information and tries to connect to the server 406.

For example, when the string nsmail is passed to the interface channel IPC_OpenChannel, the rendezvous file is $PREFS_DIR/nsmail.sok. The "nsmail.sok" is a file that contains a platform-dependent information that a client can use to contact a server.

If "nsmail.sok" is present, IPC_OpenChannel reads it and then tries to establish a connection to the 16-bit port number specified using the localhost interface to the server using the platform-dependent parameters in nsmail.sok.

The server then determines whether a connection is successfully established 408. If it is determined that the connection is successful 408, the client and the server establish a communication channel 410. For example, If a connection is established, the client writes the client key to the connection and then reads 64 bits from the connection. If the read is successful and the 64 bits read from the connection match the 64-bit server key, an IPCChannel is created and returned to the caller.

If any of the above steps fail, the client assumes that the server is not running and should be started. The client starts the server 412 and waits for the server to be initialized 414. For example, the NSPR function CreateProcess is used to start the server, and then a platform-specific mechanism is used to wait for the server to initialize, e.g. WaitForInputIdle on Windows and Inheritable file descriptor on other platforms.

After the server has been initialized 412, 414, the client attempts to connect to the server again 416. For example, the client may attempt to connect using nsmail.sok as in the preceding paragraph. If the second attempt to connect fails, IPC_OpenChannel returns NULL to the caller 418.

Figure 5:
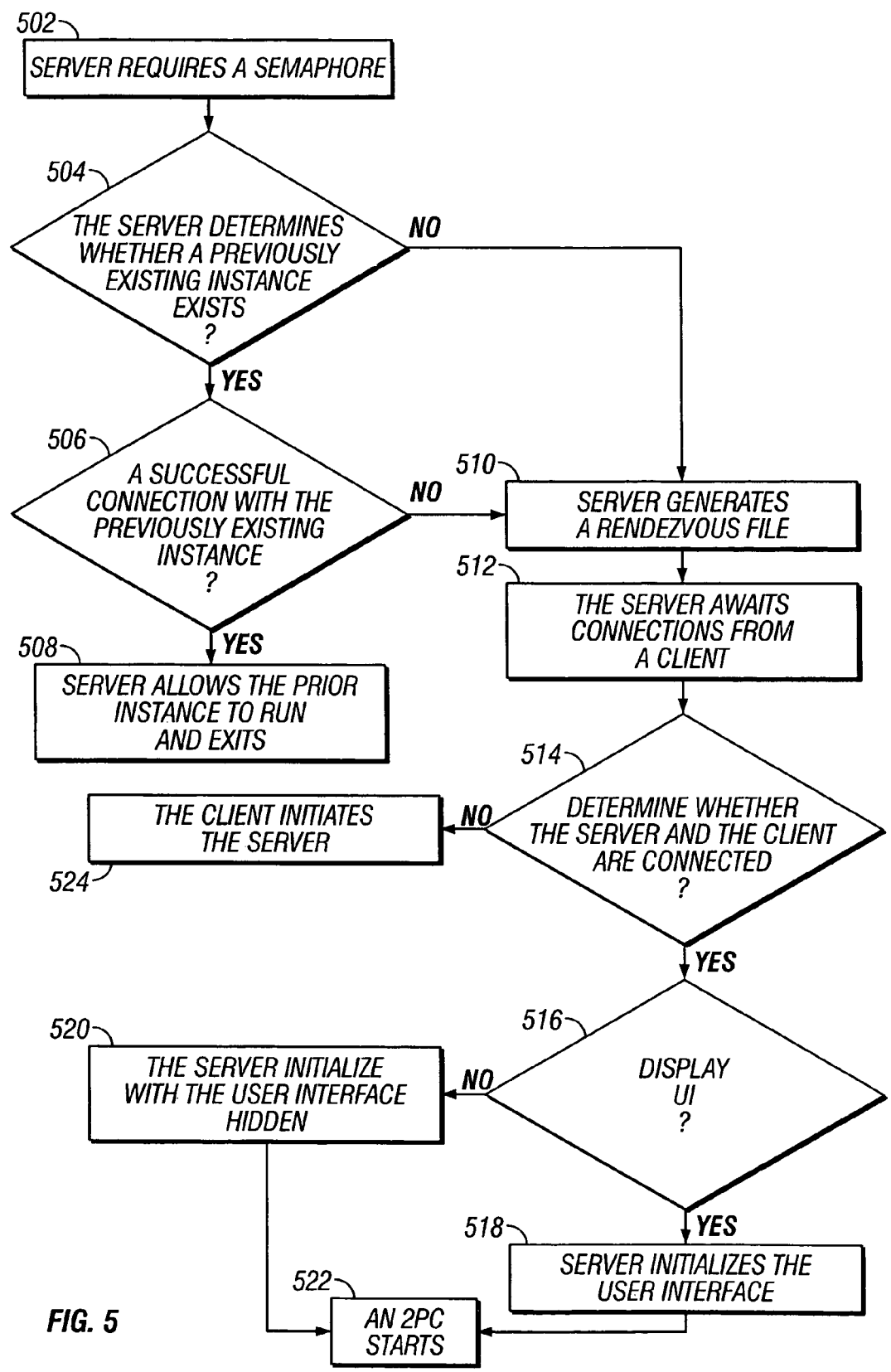
FIG. 5 is a figure diagram showing a method of inter-process communication between two applications on a single computer according to the invention.

FIG. 5 is a flow diagram showing a method of initiating an inter-process communication between two applications on a single computer according to the invention. The invention provides an efficient method of making connections between two applications via an IPC process to ensure that only one instance is running.

Referring now to FIG. 5, the server initialization code is stored in a file on the server. For example, a server initialization code may be stored in a file "lib/wxutil/PhotonApp.cpp". At initialization, the server acquires a semaphore 502, e.g., an NSPR PRSem semaphore to prevent races involving multiple clients launching the same server simultaneously. After acquiring the semaphore 502, the server determines whether a prior instance exists 504.

If it is determined a prior instance exists 504, it is further determined whether a connection to the prior instance can be established 506. If such a connection can be established 506, the server allows the prior instance to run and exits 508. For example, after a server sends its command line arguments to the previously existing instance, the server releases the semaphore and exits.

If it is determined that no previous instance exists 504, the server generates a rendezvous file 510. A typical rendezvous file contains a client key, a server key and transport parameters information. For example, the server creates a socket and binds it to a port on the local host interface. Then the server generates two 64-bit random numbers, and writes out a rendezvous file, e.g. a rendezvous file for Mail can be "nsmail.sok."

The server waits for connections from a client 512. Typically, a new thread is spawned to await connections from the client. The client attempts to establish a connection to the server. In one embodiment, the client reads the rendezvous file and starts sending a client key to the server. The server verifies the client key. Meanwhile, the server sends to the client the server key and the client verifies the server key. It is then determined whether the server is successfully connected to the client 514.

If it is determined that the server is successfully connected to the client 514, it is then determined whether the user interface on the server shall be displayed 516.

If it is determined that the user interface on the server shall be initialized 516, in one embodiment, the semaphore is released and the server's user interface initializes 518. Alternatively, if it is determined that the user interface on the server shall not be initialized 516, the server stays hidden with the user interface hidden 520. For example, the server can be started with the "-server" argument.

After the client and the server are successfully connected and properly initiated, an IPC process begins 522. Typically, an IPC Message traffic starts to flow.

If it is determined that the server is not successfully connected to the client 514, the client initiates the server 524.

In this way, one embodiment of the invention provides a method of initiating a server application and only one copy of the server application by a client application running on a single computer.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method of inter-process communication between at least two application processes on one computer, comprising the steps of:
   a first process of a first application determining a name of a first rendezvous file in a file system of the computer, the name of the first rendezvous file being associated with a second application, the first rendezvous file containing information for the first process to connect to a second process of the second application for inter-process communication;
   the first process initiating a first connection to the second process using the information contained in the first rendezvous file;
   the first process communicating with the second process using the first connection if the first connection is successfully established to request the second process to perform a task for the first process by transmitting a set of keys and values between said second process and said first process; and
   the first process starting a third process of the second application if the first process fails to establish a connection with the second process,
   wherein multiple instances of an application process combine into one running instance of said application process;
   wherein said inter-process communication between at least two application processes is restricted to communications between applications running on a single processor of said single computer under control of a single instance of an operating system.

2. The method of claim 1, further comprising:
   the first process initiating a second connection to the third process using the information in the first rendezvous file, in response to the third process informing the first process that the third process is ready for a connection.

3. The method of claim 2, wherein the third process is started in a server mode without a user interface.

4. The method of claim 1, wherein the first process fails to establish a connection with the second process because the second process is not running.

5. The method of claim 1, wherein the first rendezvous file being missing from the file system indicates that the second process is not running.

6. The method of claim 1, further comprising:
   when the first process is started, the first process determining if a fourth process of the first application is running;
   the first process requesting the fourth process to perform a task for the first process if the fourth process is running; and
   the first process exiting after requesting the fourth process to perform the task for the first process.

7. The method of claim 6, wherein the first process determining if the fourth process of the first application is running comprises:
   the first process of the first application determining a name of a second file in the file system of the computer, the name of the second file being associated with the first application.

8. The method of claim 7, wherein the second file being missing from the file system indicates that the fourth process of the first application is not running.

9. The method of claim 8, wherein the second file contains information for the first process to connect to a fourth process for inter-process communication;
   failure in connecting to the fourth process using the information contained in the second file indicates that the fourth process of the first application is not running; and
   success in connecting to the fourth process using the information contained in the second file indicates that the fourth process of the first application is running.

10. The method of claim 1, wherein the first process communicates with the second process using the first connection through an Application Program Interface (API).

11. The method of claim 10, wherein the Application Program Interface (API) is platform independent.

12. The method of claim 1, further comprising:
   when the second process is started, the second process determining if a fourth process of the second application is running;
   the second process requesting the fourth process to perform a task for the second process if the fourth process is running; and
   the second process exiting after requesting the fourth process to perform the task for the second process.

13. The method of claim 1, wherein said the process determines a name of the first rendezvous file from a filename of the first application, wherein the second application locates the first rendezvous file, without prior knowledge of a running instance of the first application program, through use of the filename.

14. An apparatus for comprising a single processor on a single computer for inter-process communication between at least two application processes on the single processor, comprising the steps of:

a module for a first process of a first application determining a name of a first rendezvous file in a file system of the computer, the name of the first rendezvous file being associated with a second application, the first rendezvous file containing information for the first process to connect to a second process of the second application for inter-process communication;

a module for the first process initiating a first connection to the second process using the information contained in the first rendezvous file;

a module for the first process initiating communication with the second process using the first connection if the first connection is successfully established;

commanding the second application to perform a task for the first application if the first connection is successfully established;

transmitting a set of keys and values between the second application and the first application;

after commanding the second application to perform the task, closing the first application, wherein multiple instances of an application process combine into one running instance of the application process; and wherein the inter-process communication between at least two application processes is restricted to communications between applications running on the single processor of the single computer under control of a single instance of an operating system.

15. The apparatus of claim 14, wherein the first process fails to establish a connection with the second process because the second process is not running.

16. The apparatus of claim 14, wherein the first rendezvous file being missing from the file system indicates that the second process is not running.

17. The apparatus of claim 14, further comprising:
a module for the first process determining if a fourth process of the first application is running, when, the first process is started;
a module for the first process requesting the fourth process to perform a task for the first process if the fourth process is running; and
a module for the first process exiting after requesting the fourth process to perform the task for the first process.

18. The apparatus of claim 17, wherein the module for the first process determining if the fourth process of the first application is running comprises:
a module for the first process of the first application determining a name of a second file in the file system of the computer, the name of the second file being associated with the first application.

19. The apparatus of claim 18, wherein the second file being missing from the file system indicates that the fourth process of the first application is not running.

20. The apparatus of claim 19, wherein the second file contains information for the first process to connect to a fourth process for inter-process communication; failure in connecting to the fourth process using the information contained in the second file indicates that the fourth process of the first application is not running; and success in connecting to the fourth process using the information contained in the second file indicates that the fourth process of the first application is running.

21. The apparatus of claim 14, wherein the module for the first process communicates with the module for the second process using the first connection through an Application Program Interface (API).

22. The apparatus of claim 21, wherein the module for the Application Program Interface (API) is platform independent.

23. The apparatus of claim 14, further comprising:
a module for the second process determining if a fourth process of the second application is running, when the second process is started;
a module for the second process requesting the fourth process to perform a task for the second process if the fourth process is running; and
a module for the second process exiting after requesting the fourth process to perform the task for the second process.

24. The apparatus of claim 14, further comprising a step of:
a module for the first process starting a third process of the second application if the first process fails to establish a connection with the second process.

25. The apparatus of claim 24, further comprising:
a module for the first process initiating a second connection to the third process using the information in the first rendezvous file, in response to the third process informing the first process that the third process is ready for a connection.

26. The apparatus of claim 24, wherein the third process is started in a server mode without a user interface.

27. A program storage medium readable by a computer, tangibly embodying a program of instructions executable by the computer to perform a method of inter-process communication between at least two application processes on a single processor of a single$_{13}$computer, the method comprising the steps of:
a first process of a first application determining a name of a first rendezvous file in a file system of the computer, the name of the first rendezvous file being associated with a second application, the first rendezvous file containing information for the first process to connect to a second process of the second application for inter-process communication; and
the first process initiating a first connection to the second process using the information contained in the first rendezvous file;
the first process communicating with the second process using the first connection if the first connection is successfully established; and
the first process starting a third process of the second application if the first process fails to establish a connection with the second process,
wherein the step of communicating communicates a task of the second application to the first application, wherein the task comprises transmitting a set of keys and values between the second application and the first application, wherein the step of communicating uses to transmit the keys and the values,
wherein the step of communicating the task of the second application to the first application further comprises use of a channel,
wherein the inter-process communication between at least two application process is restricted to communications between applications running on the single processor of the single computer under control of a single instance of an operating system,
wherein the step of communicating the task of the second application to the first application results in one and only one instance of an application runs on the single processor of the computer.

28. The medium of claim 27, wherein the method further comprises the step of:
the first process initiating a second connection to the third process using the information in the first rendezvous file, in response to the third process informing the first process that the third process is ready for a connection.

29. The medium of claim 28, wherein the third process is started in a server mode without a user interface.

30. The medium of claim 27, wherein the first process fails to establish a connection with the second process because the second process is not running.

31. The medium of claim 27, wherein the first rendezvous file being missing from the file system indicates that the second process is not running.

32. The medium of claim 27, wherein the method further comprises the steps of:
when the first process is started, the first process determining if a fourth process of the first application is running;
the first process requesting the fourth process to perform a task for the first process if the fourth process is running; and
the first process exiting after requesting the fourth process to perform the task for the first process.

33. The medium of claim 32, wherein the first process determining if the fourth process of the first application is running comprises:
the first process of the first application determining a name of a second file in the file system of the computer, the name of the second file being associated with the first application.

34. The medium of claim 33, wherein the second file being missing from the file system indicates that the fourth process of the first application is not running.

35. The medium of claim 34, wherein the second file contains information for the first process to connect to a fourth process for inter-process communication;
failure in connecting to the fourth process using the information contained in the second file indicates that the fourth process of the first application is not running; and
success in connecting to the fourth process using the information contained in the second file indicates that the fourth process of the first application is running.

36. The medium of claim 27, wherein the first process communicates with the second process using the first connection through an Application Program Interface (API).

37. The medium of claim 36, wherein the Application Program Interface (API) is platform independent.

38. The medium of claim 27, wherein the method further comprises the steps of:
when the second process is started, the second process determining if a fourth process of the second application is running;
the second process requesting the fourth process to perform a task for the second process if the fourth process is running; and
the second process exiting after requesting the fourth process to perform the task for the second process.

39. A method of inter-process communication between at least two application programs on a single processor of a single computer, comprising the steps of:
initiating a first application program on said single processor;
upon initiating a second application program, said second application program using a rendezvous file while determining if a prior instance of the second application program is running on said single processor;
if said first application program comprises a prior instance of said second application program and said first program is still running, performing all of:
establishing an inter-process communication channel between said second application program and said first application program;
commanding said first application program to perform a task for said second application program by transmitting a set of keys and values between said second application program and said first application program;
after commanding said first application program to perform said task, exiting said second application program,
wherein multiple instances of an application program combine into one running instance of said application program running on said single processor of said single computer.

40. The method of claim 39, wherein said rendezvous file comprises a filename named after said first application program, wherein said second application program can locate said rendezvous file, without prior knowledge of a running instance of said first application program, through use of said filename.

41. The method of claim 40, wherein said rendezvous filename comprises placement in a predetermined location, wherein said second application program can locate said rendezvous file, without prior knowledge of a running instance of said first application program, through use of both said filename and said location.

42. The method of claim 39, further comprising a step of said second application program computing a filename of said rendezvous file from a name of said second application program and using said filename in said step of establishing said inter-process communication channel between said second application program and said first application program.

43. The method of claim 39, further comprising a step of using strings to transmit said keys and said values.

44. The method of claim 39, wherein said step of communicating said task of said second application program to said first application program comprises use of a channel.

45. The method of claim 44, wherein said channel connects a server process of said second application program to a client process of said first application program.

46. The method of claim 39, wherein said method of inter-process communication comprises communication based upon a filename, wherein a software application based upon said method is not operating system-dependent when said operating system provides access to files.

* * * * *